Figure 1:
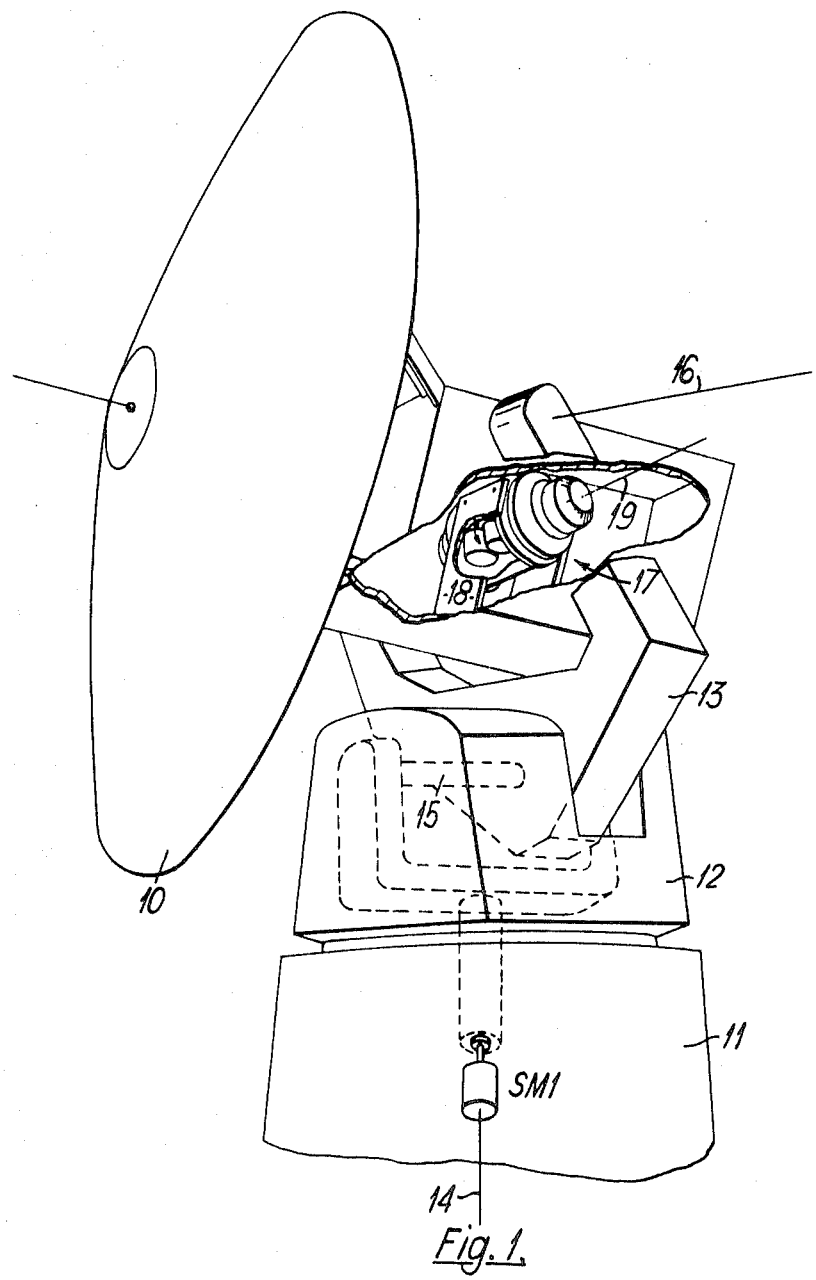

United States Patent

[11] 3,599,495

| [72] | Inventors | Kenneth Robson Brown<br>Midlothian;<br>Charles Ian Crawford, Edinburgh; Erskine<br>Robert Reid, Midlothian, all of, Scotland |
|---|---|---|
| [21] | Appl. No. | 860,277 |
| [22] | Filed | Sept. 23, 1969 |
| [45] | Patented | Aug. 17, 1971 |
| [73] | Assignee | Ferranti, Limited |
| [32] | Priority | Sept. 26, 1968 |
| [33] | | Great Britain |
| [31] | | 45734/68 |

[54] SYSTEMS FOR GYROSCOPICALLY STABILIZING AND CONTROLLING EQUIPMENT MOUNTED ON VEHICLES
8 Claims, 2 Drawing Figs.

[52] U.S. Cl. .................................................. 74/5.34,
73/504, 343/DIG. 2, 343/761
[51] Int. Cl. ............................................................ G01c 19/32
[50] Field of Search .......................................... 74/5.22,
5.34; 73/504; 343/905 S, 756 S, 761; 33/204

[56] References Cited
UNITED STATES PATENTS

| 3,084,342 | 4/1963 | Fuller et al. .................... | 74/5.22 X |
| 3,127,774 | 4/1964 | Fischer et al. ................. | 73/504 |
| 3,258,977 | 7/1966 | Hoffman ....................... | 74/5.34 |
| 3,286,265 | 11/1966 | Clemence et al. ............. | 343/761 |
| 3,355,954 | 12/1967 | Levine et al. .................. | 74/5.34 |
| 3,456,513 | 7/1969 | Emerson ....................... | 73/504 X |
| 3,492,735 | 2/1970 | Burdick et al. ................ | 74/5.34 X |

FOREIGN PATENTS

| 890,264 | 2/1962 | Great Britain ................ | 343/756 S |

Primary Examiner—Manuel A. Antonakas
Attorney—Cameron, Kerkam & Sutton

ABSTRACT: A system by which equipment mounted on a vehicle, such as an aerial on a ship, may be stabilized and controlled comprises mounting the equipment on a three-axis gimbal system with the elevation axis comprising the inner gimbal axis, providing on the equipment a control and stabilizing unit including a gyroscopically stabilized platform which defines a vertical reference axis, the unit being arranged to drive the servomechanisms associated with the gimbal axes to stabilize and control the equipment, and the stabilized platform being tended to be rotated by a fourth, precision servomechanism about an axis parallel to the inner gimbal axis in response to elevation positional information signals.

SYSTEMS FOR GYROSCOPICALLY STABILIZING AND CONTROLLING EQUIPMENT MOUNTED ON VEHICLES

This invention relates to equipment pointing systems for equipment such as aerials. In particular the invention relates to equipment pointing systems for use on vehicles such as ships, the equipment being required to be stabilized in, and to be directed into, predetermined spatial attitudes.

It is an object of the present invention to provide an equipment mounting system in which a direction control and stabilizing unit is mounted on the equipment.

According to the present invention an equipment pointing system for use on a vehicle is mounted on the vehicle by means of a three-axis gimbal system, the elevation axis of the equipment comprising the inner gimbal axis, there being provided a control and stabilizing unit operable to determine the spatial attitude of the equipment at least in elevation in response to positional information signals and to stabilize the spatial attitude of the equipment against pitching and rolling of the vehicle, the control and stabilizing unit being arranged to drive three servomechanisms each individually associated with a different gimbal axis, the control and stabilizing unit including a stabilized platform mounted with respect to the inner gimbal for movement relative thereto only about an axis parallel to said inner gimbal axis by a fourth servomechanism, the arrangement being such that the fourth servomechanism is energized to tend to rotate the stabilized platform in response to elevation positional information signals, the stabilized platform comprising two levelling loops extending along two horizontal axes to define a vertical reference axis, one of said horizontal axes comprising the inner gimbal axis, each levelling loop having a sensor to measure deviations of the equipment in a vertical plane including the horizontal axis associated with the levelling loop and a gyroscope to stabilize the equipment in said plane in response to signals from the deviation sensor, the servomechanism driving the equipment about the inner gimbal axis being energized in response to output signals of the gyroscope of the levelling loop extending along said one horizontal axis, and the servomechanisms associated with the outer two gimbal axes being energized in response to signals provided by successively resolving the output signals of the gyroscope of the other levelling loop by a resolver mounted on the axis of the stabilized platform and by a resolver mounted on the inner gimbal axis.

The gyroscopes provide output signals in consequence to the energization of the fourth servomechanism or to the pitching and rolling of the vehicle.

Each levelling loop may comprise a Schuler loop "detuned" for a multiple of the Schuler frequency (i.e. the gain of the loop being increased), the response of the levelling loop being improved by introducing damping. In such an arrangement the gyroscope of the levelling loop may be either a rate integrating gyroscope or a two-axis gyroscope having one axis extending along the horizontal axis associated with the levelling loop.

Figure 2:
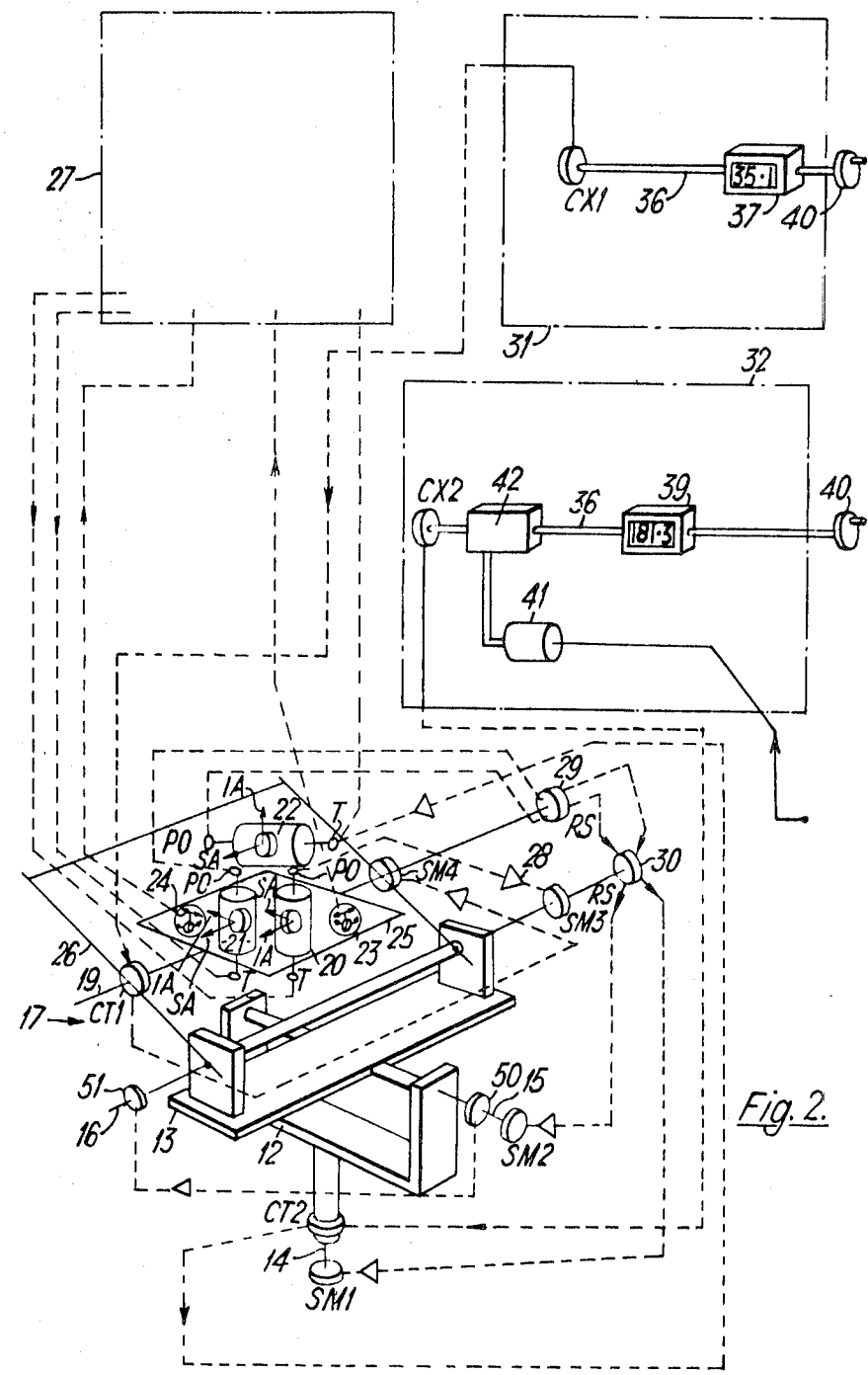

The present invention will now be described by way of example with reference to the accompanying drawings, in which:

FIG. 1 is a view of a ship's aerial mounting system which is partially sectioned in order to show the control and stabilizing unit associated therewith, and FIG. 2 shows in diagrammatic form the control and stabilizing unit and associated means for controlling the aerial mounting system.

In FIG. 1 an aerial 10 is shown as being mounted on a ship in a three-axis gimbal system, a part of the ship's structure being indicated at 11 and gimbals at 12 and 13. The gimbal system has a TRAINING axis perpendicular to the deck of the ship as indicated at 14 and two horizontal axes 15 and 16. One horizontal axis 16 comprises a LEVEL axis, and the other horizontal axis 15 comprises a CROSS-LEVEL axis, the axes 15 and 16 not necessarily coinciding with the fore-and-aft axes of the ship but refer to the aerial sight line. Aerial movement about the axes 14, 15 and 16 is controlled respectively by servomotors SM1, SM2 and SM3 and the aerial is pointed in any spatial attitude and is stabilized against the pitching and rolling of the ship about the horizontal axes 15 and 16 by selective energization of the servomotors in response to signals from a control and stabilizing unit 17. The unit 17 is rotatably mounted on the aerial 10 within a housing 18 secured to the aerial. An AC precision instrument-type servomotor SM4 is provided and tends to rotate the unit 17 about an axis 19.

The unit 17 and associated control means, as shown in FIG. 2, includes a cluster of three flotation type, rate integrating gyroscopes 20, 21 and 22 and two platform deviation sensors comprising accelerometers 23 and 24, this cluster comprising a stabilized platform indicated at 25. The axis 19 is provided by a structure 26 which is pivotally mounted on the inner, LEVEL gimbal axis 16. The accelerometers 23 and 24 have their input axes respectively along the LEVEL and CROSS-LEVEL axes 16 and 15, and are respectively arranged to detect any deviation of the platform 25 about the CROSS-LEVEL axis 15 and the LEVEL axis 16. The accelerometers supply signals in response to any detected deviation via an electronics unit, indicated in chain-line form at 27, to the torque motors T of the gyros 21 and 20 respectively to apply the necessary control torques to these gyros to stabilize the platform in a horizontal plane. Thus there is established a vertical reference axis for the aerial, levelling loops comprising "detuned" Schuler loops being provided in association with the horizontal axes 15 and 16.

The output axes of the gyros 20, 21 and 22 have pickoff devices PO, torque motors T, and the input axes of the gyros are indicated at IA and the spin axes at SA. The output axes of the stabilizing gyros 20 and 21 extend vertically and so the extent of gravity-induced drifts of these gyros is negligible. The input axes IA and spin axes SA of these gyros extend horizontally and may be considered to be coincident with either the LEVEL axis 16 or the CROSS-LEVEL axis 15. The torque motors T of the gyros 20 and 21 are energized by signals from the control unit 27 only in order to maintain the levelling loops.

The gyro 22 comprises an AZIMUTH gyro to point the aerial in azimuth in response to azimuth information signals. The input axis IA of the gyro 22 extends vertically and the spin axis SA extends parallel to the LEVEL axis 16. This gyro also stabilizes the aerial against yawing of the ship.

Precession of the gyros 20 and 21 due to the pitching and rolling of the ship is detected by the associated pickoff device PO and corresponding signals are supplied to the servomotors SM1, SM2 and SM3. The signals from the LEVEL gyro 20 are passed directly via an amplifier 28 to SM3.

However, in order to direct the aerial 10 in azimuth in response to the azimuth information signals, and in order to stabilize the aerial about the CROSS-LEVEL axis 15 it is necessary to rotate the aerial about both the TRAINING axis 14 and the CROSS-LEVEL axis 15. This is necessary because the platform 25 is stabilized in a horizontal plane and has freedom of movement about the LEVEL axis 16. Hence the input axes IA of the CROSS-LEVEL gyro 21 and the AZIMUTH gyro 22 are to be aligned to the horizontal and to the vertical respectively at all times, and not necessarily to the horizontal axis of the ship's deck and the TRAINING axis 14 respectively because of the pitching and rolling of the ship. Thus, the outputs of the pickoff devices of the gyros 21 and 22 are resolved through the angle between the deck of the ship and the platform 25, the magnitude of this angle being equal to the sum of the angular displacements of the aerial 10 relative to the platform 25 and the angle of rotation of the inner gimbal 13 relative to the aerial 10. Therefore, the signals from the pickoff devices of both gyros 21 and 22 are resolved through this angle before being applied to energize the servomotors SM1 and SM2. This is achieved by successive resolutions of the outputs of the gyros 21 and 22 by a four-winding resolver 29 mounted on the axis 19 of the platform 25 and by a four-winding resolver 30 mounted on the LEVEL axis 16. The appropriate output of the resolver 30 is applied to SM1 and the other output is applied to SM2.

In addition to being directed along the required azimuth bearing and to being stabilized for the pitching and rolling of the ship the aerial 10 is rotatable relative to the platform 25 in response to elevation positional information signals.

As shown in FIG. 2, the elevation and azimuth positional information signals are provided respectively by an elevation control unit 31 and an azimuth control unit 32. Each control unit 31 or 32 includes a shaft 36, which shaft drives a readout counter 39 arranged to give a display of the appropriate bearing of the aerial 10, and the shaft 36 is rotated by manual means indicated at 40.

In the elevation control unit 31 the rotor of a synchro transmitter CX1 is driven by the shaft 36, the transmitter indicating the demanded elevation angle. The stator windings of the transmitter CX1 are connected to the stator windings of a synchro transformer CT1 on the axis 19 of stabilized platform 25. Thus, the demanded elevation angle is compared with the aerial elevation angle as defined by the transformer CT1. Any resulting error signal drives the precision servomotor SM4. The consequent torque applied to the platform 25 about the axis 19 tends to drive the platform relative to the aerial through reduction gearing of 6,600 to 1 (not shown). The torque applied about the axis 19 causes the LEVEL gyro 20 to precess, the pickoff output of the gyro energizing the servomotor SM3 on the LEVEL axis 16. Thus, the aerial and the platform 25 are driven such that an equal and opposite torque to that applied about the axis 19 by the servomotor SM4 is applied to the platform 25. Hence the platform 25 is held stationary in space while the aerial is rotated in elevation with respect to the platform. Both motors SM3 and SM4 drive until the rotor of the transformer CT1 has rotated by the same angle as that of the rotor of the transmitter CX1, reducing the error signal to zero. Thus, the rotation of the aerial in elevation is exactly controlled by the rotation of the shaft 36 of the unit 31.

The azimuth control unit 32 is connected to the outer gimbal 12 via a synchro transmitter CX2, the rotor of the transmitter being driven by the shaft 36 of the unit 32. The stator windings of the transmitter CX2 are connected to the stator windings of a synchro transformer CT2 on the TRAINING axis 14. Any resulting error signal is applied to the torque motor T of the azimuth gyro 22. The consequent precession of the AZIMUTH gyro 22 causes the pickoff of the gyro to energize the servomotors SM1 and SM2 in the manner described above. This causes rotation of the aerial in azimuth, and hence also causes a corresponding rotation of the rotor of the transformer CT2 until the aerial azimuth bearing corresponds to that indicated by the counter 39.

The aerial 10 is driven in azimuth by a signal proportional to the sum of the ship's heading and the aerial heading minus the value of the desired azimuth bearing of the aerial. This signal is obtained by coupling a compass repeater 41, which is connected to the ship's gyrocompass (not shown), to the shaft 36 of the azimuth control unit 32 by differential gearing 42.

Corrections for the rotation of the earth and for the ship's movement over the surface of the earth may be made by providing the appropriate correction signals for the platform 25 from the electronics unit 27, so that the desired vertical reference axis is maintained by the platform. For this purpose information signals indicating the ship's heading and speed are supplied to the electronics unit, together with intermittent information about the ship's latitude.

The aerial may also be operated in a free azimuth mode, in contradistinction to the closed-loop servosystem described above. In the free mode the aerial is directed solely by the AZIMUTH gyro 22 (and is especially useful when large compass errors occur due to the ship maneuvering).

Means for rapidly slewing the aerial in azimuth, and means for providing coarse alignment in azimuth may be provided.

When the system is operating with a closed-loop azimuth control the effect of the ship's oscillatory motion requires correction. The synchro transformer CT2 which is used to slave the aerial in azimuth to the azimuth control unit 32 does not provide the true azimuth bearing required for the aerial with respect to the ship due to pitching and rolling. This error arises because the TRAINING axis 14 is not the inner axis of the three-axis gimbal system. The inner axis has to comprise the axis about which the aerial is rotated in elevation, the stabilized platform 25 being mounted on the aerial so as to provide a vertical reference axis, and the aerial being rotated in elevation with respect to this vertical reference axis. However, the oscillatory output of the transformer CT2 may be nulled as follows:

$$dG/dt = (dl/dt) \sin CL$$

where $dG/dt$ is the rate of rotation of the outer gimbal 12 about the TRAINING axis 14 due to the pitching and rolling of the ship, $dL/dt$ is the rate of change of angle of the LEVEL gimbal 13 due to the ship's motion, and $CL$ is the angle of the CROSS-LEVEL gimbal 12.

This equation is approximately $$dG/dt = (dL/dt) CL$$

and hence a signal representative of the term $dG/dt$ may be obtained by applying a signal from a linvar resolver 50 on the CROSS-LEVEL axis 15 to a signal from a tachogenerator 51 on the LEVEL axis 16. The representative signal is applied to the azimuth loop in the opposite sense after passing through an integrator (not shown). Drift of the integrator may easily be corrected by ensuring that the output of the integrator is zero when both the LEVEL and CROSS-LEVEL angles are zero. A filter in the closed azimuth loop attenuates any residual error.

The line of sight can also be altered by manual corrections to the control units 31 and 32 by reference to an instrument indicating variations in the strength of the signal being received by the aerial. Alternatively the position of the aerial may be updated to allow for the ship's movement over the surface of the earth by generating rates of change of elevation and azimuth angles from the ship's speed. These terms are used to drive, via electromagnetic integrators, the shafts 36. If the system is operating with a free azimuth mode, rotation of the azimuth shaft not altering the azimuth angle of the aerial, the AZIMUTH gyro 22 is torqued at the required rate by means of a signal representative of the appropriate term referred to above (and in addition the shaft is rotated so that the counter 39 indicates the aerial azimuth angle).

The AZIMUTH gyro 22 may be replaced by a servosystem.

The initial setting-up procedure for the stabilized platform is conventional, except that the aerial may be automatically aligned in the predetermined direction at the same time as the vertical reference axis of the control and stabilizing unit is being established.

It will be appreciated that the mounting system may be used for equipment other than the aerial described above. Similarly the invention is not restricted to use on ships, but may be used on land vehicles or aircraft.

The aerial may be arranged to be driven by elevation and azimuth positional information signals in the form of tracking error signals from a radar receiver or other source. Thus signals received by the aerial from a signal source such as a satellite at which it is directed may be analyzed by the radar receiver, and tracking error signals passed to the elevation and azimuth control units 31 and 32 so as to drive the aerial.

The equipment pointing system described above is of a simple form for a system of which a high degree of accuracy is demanded. Operation through the zenith presents no problem with this system. The system does not require complex resolving procedures in order to provide positional information signals to the servomechanisms. The system avoids providing a stabilized platform remote from the equipment and hence no error is introduced due to the flexing of the vehicle's structure between the mountings of the equipment and the stabilized platform. Further, in such an arrangement, synchro noise due to the size of the synchros, the transmission distance associated with the synchros, and the large amplitude of synchro rotation encountered under normal operating conditions, is also avoided.

What we claim is:

1. A system for pointing equipment for use on a vehicle which equipment is mounted on a vehicle by means of a three-axis gimbal system having an inner gimbal, an outer gimbal, an inner gimbal axis and two outer gimbal axes, and wherein the elevation axis of the equipment comprises the inner gimbal axis, said system including means for providing elevation and azimuth positional information signals, a control and stabilizing unit operable to determine the spatial attitude of the equipment at least in elevation in response to said positional information signals and to stabilize the spatial attitude of the equipment against pitching and rolling of the vehicle, the control and stabilizing unit being arranged to drive three servo mechanisms each individually associated with a different gimbal axis, the control and stabilizing unit including a stabilized platform mounted with respect to the inner gimbal for movement relative thereto only about an axis parallel to said inner gimbal axis, a fourth servomechanism for so moving said stabilized platform, the arrangement being such that the fourth servomechanism is energized to tend to rotate the stabilized platform in response to said elevation positional information signals, the stabilized platform comprising two levelling loops extending along two horizontal axes to define a vertical reference axis, one of said horizontal axes comprising the inner gimbal axis, each levelling loop having a sensor to measure deviations of the equipment in a vertical plane including the horizontal axis associated with the levelling loop and a gyroscope to stabilize the equipment in said plane in response to signals from the deviation sensor, the servomechanism driving the equipment about the inner gimbal axis being energized in response to output signals of the gyroscope of the levelling loop extending along said one horizontal axis, and the servomechanisms associated with the outer two gimbal axes being energized in response to signals provided by successively resolving the output signals of the gyroscope of the other levelling loop by a resolver mounted on the axis of the stabilized platform and by a resolver mounted on the inner gimbal axis.

2. A system as claimed in claim 1 in which each levelling loop comprises a Schuler loop detuned for a multiple of the Schuler frequency, the response of the levelling loop being improved by introducing damping.

3. A system as claimed in claim 2 in which each leveling loop has a rate-integrating gyroscope.

4. A system as claimed in claim 1 in which the fourth servomechanism includes a precision, instrument-type servomotor.

5. A system as claimed in claim 1 in which the control and stabilizing unit includes a gyroscope arranged to rotate the equipment in azimuth in response to azimuth positional information signals.

6. A system as claimed in claim 5 in which the azimuth gyroscope is a rate-integrating gyroscope.

7. A system as claimed in claim 1 having means for causing rotation about a gimbal axis in response to said azimuth positional information signals in a closed loop together with said means for providing said azimuth positional information signals, and including means for supplying a signal representative of the rate of rotation of said gimbal axis due to pitching and rolling of the vehicle, together with means for integrating said representative signal, and means for applying the integrated signal to said closed loop to cause the rotation of said gimbal axis due to the pitching and rolling of the vehicle to be compensated.

8. A system as claimed in claim 7 in which the means for supplying said representative signal comprises a tachogenerator mounted on the inner gimbal axis and linvar resolver mounted on the remaining gimbal axis of the three-axis gimbal system, the output of the linvar resolver being arranged to be applied to the tachogenerator.